US 6,468,677 B1

(12) United States Patent
Benton et al.

(10) Patent No.: US 6,468,677 B1
(45) Date of Patent: Oct. 22, 2002

(54) ELECTROLUMINESCENT HIGH PRESSURE LAMINATE

(75) Inventors: Larry Don Benton, Waco; Janice S. Walker, Fredericksburg; Emily A. Edwards; Eric Warren Kendall, both of Temple; Herbert B. Justice, Moody, all of TX (US)

(73) Assignee: Premark RWP Holdings Inc., Wilmington, DE (US)

( * ) Notice: Subject to any disclaimer, the term of this patent is extended or adjusted under 35 U.S.C. 154(b) by 1 day.

(21) Appl. No.: 09/630,139

(22) Filed: Aug. 1, 2000

(51) Int. Cl.[7] .............................. B32B 9/00; B32B 31/00
(52) U.S. Cl. ...................... 428/690; 428/42.1; 428/917; 428/927; 428/929; 313/502; 313/503; 313/504; 427/66; 156/67
(58) Field of Search ................................ 428/690, 917, 428/42.1, 927, 929; 427/66; 313/502, 503, 504; 156/67

(56) References Cited

U.S. PATENT DOCUMENTS

| | | | |
|---|---|---|---|
| 3,993,842 A | 11/1976 | Hirsch et al. ................ 428/421 |
| 4,020,389 A | 4/1977 | Dickson et al. | |
| 4,250,398 A | 2/1981 | Ellis et al. .................. 219/345 |
| 4,474,841 A | 10/1984 | Kerekes ........................ 428/78 |
| 4,532,395 A | 7/1985 | Zukowski | |
| 4,593,228 A | 6/1986 | Albrechtson et al. ....... 313/509 |
| 4,628,187 A | 12/1986 | Sekuguchi et al. ......... 219/505 |
| 4,645,970 A | 2/1987 | Murphy ....................... 313/509 |
| 4,665,342 A | 5/1987 | Topp et al. | |
| 4,684,353 A | 8/1987 | deSouza ....................... 445/51 |
| 4,721,883 A | 1/1988 | Jacobs et al. ................ 313/505 |
| 4,775,964 A | 10/1988 | Alessio et al. | |
| 4,788,629 A | 11/1988 | Handy et al. | |
| 4,864,473 A | 9/1989 | Tokarz et al. .................. 362/84 |
| 4,942,078 A | 7/1990 | Newman et al. ............. 428/192 |
| 5,078,634 A | 1/1992 | Yoshioka | |
| 5,160,787 A | 11/1992 | Gaku et al. | |
| 5,309,060 A | * 5/1994 | Sharpless et al. ............ 313/511 |
| 5,662,408 A | 9/1997 | Marischen ................... 362/226 |
| 5,925,275 A | 7/1999 | Lawson et al. .............. 219/543 |
| 5,932,124 A | 8/1999 | Miller et al. ................. 219/213 |

FOREIGN PATENT DOCUMENTS

| | | |
|---|---|---|
| DE | 2314890 | * 10/1973 |
| DE | 2314890 A | 10/1973 |
| DE | 4310082 A | 9/1994 |
| EP | 0710709 A | 5/1996 |
| EP | 0725119 A | 8/1996 |
| WO | WO98-00289 A | 1/1998 |
| WO | WO99-39322 A | 8/1999 |
| WO | WO00-27908 A | 5/2000 |

* cited by examiner

Primary Examiner—Cynthia H. Kelly
Assistant Examiner—Dawn L. Garrett
(74) Attorney, Agent, or Firm—Welsh & Flaxman LLC

(57) ABSTRACT

The invention relates to laminates including at least a first resin impregnated sheet having an electroluminescent compound dispersed therein and electrical leads coupling the electroluminescent compound to a source of electrical energy. The laminate is manufactured by applying an electroluminescent compound to a first resin impregnated sheet, applying electrical leads to the first sheet for the selectively application of electrical energy and heating and pressing the first sheet.

14 Claims, 2 Drawing Sheets

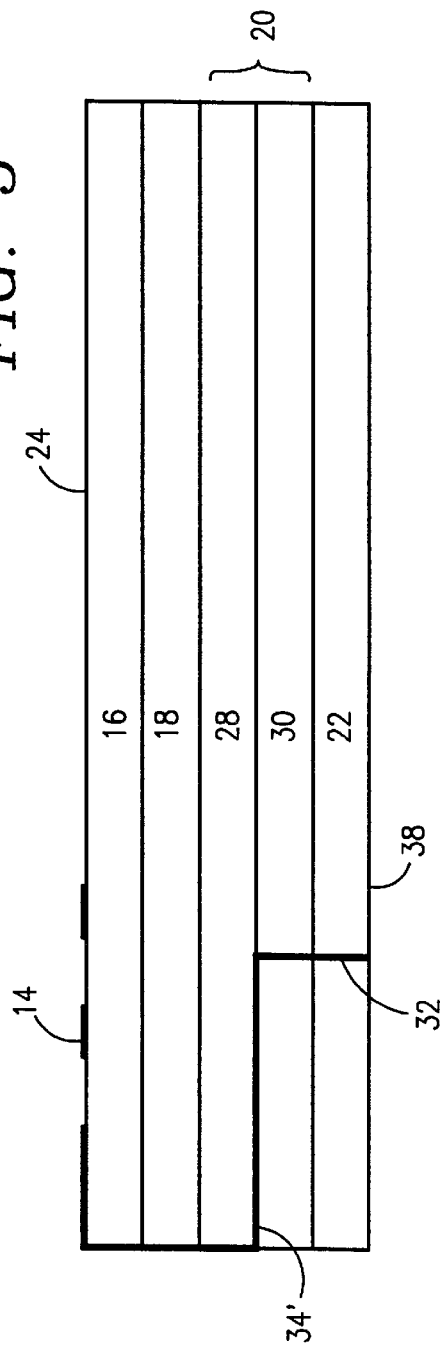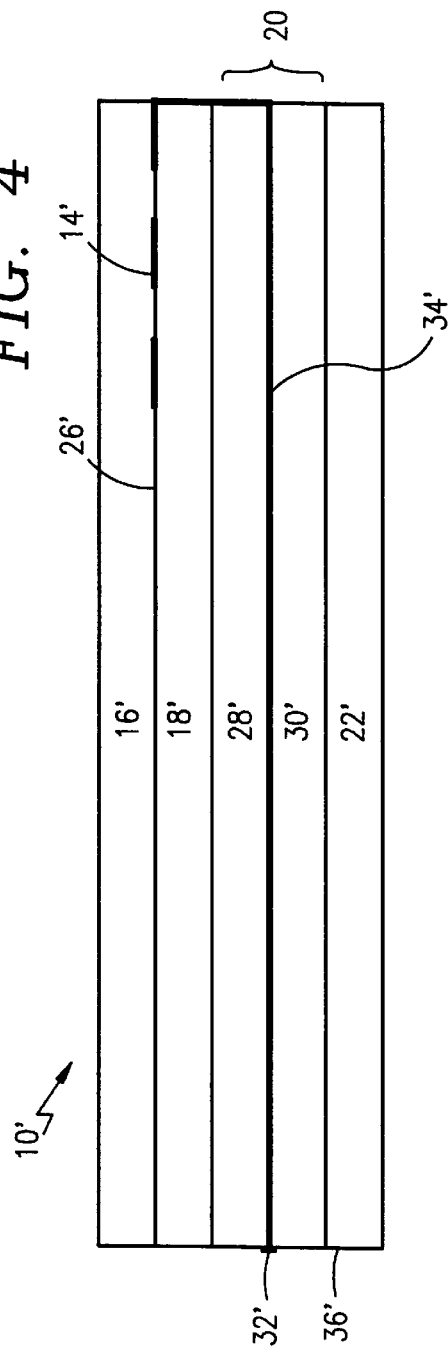

ELECTROLUMINESCENT HIGH PRESSURE LAMINATE

BACKGROUND OF THE INVENTION

1. Field of the Invention

The present invention relates to decorative laminates. More particularly, the invention relates to a decorative laminate formed with an electroluminescent compound dispersed therein.

2. Description of the Prior Art

Decorative laminates are generally constructed from plural layers of synthetic resin impregnated paper sheets bonded under heat and pressure to form a unitary structure. With regard to the manufacture of high pressure laminates, the decorative laminate sheet assembly includes at least a core of one or more phenolic resin impregnated sheets and a melamine impregnated decorative sheet. The decorative sheet may be further covered with a transparent melamine impregnated overlay layer.

The core, or base, functions to impart rigidity to the laminate. Prior to stacking, the paper sheets of the core are impregnated with a water alcohol solution of phenol formaldehyde, dried and partially cured in a hot oven. The cured laminate is then cut into predetermined shapes used to assemble the laminate layer.

The core may, for example, include a plurality of sheets of 41–68 kilogram phenolic resin impregnated kraft paper. The kraft paper is impregnated throughout and bonded with a substantially cured phenolic resin which has been converted to a thermoset state during the initial laminating step.

A solid substrate may be bonded to the laminate where additional rigidity is required. Substrates are generally composed of a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates. The substrate is commonly applied to the phenolic resin impregnated sheets making up the core only after the laminate lay-up is pressed and heated to form the final decorative laminate.

The decorative sheet provides the laminate with an attractive appearance. The decorative sheet, and the overlay layer, dictate the surface characteristics of the decorative laminate. For example, the composition of the decorative sheet and overlay layer dictate the decorative laminate's resistance to chemical agents, heat, light, impact and abrasion.

Decorative sheets are commonly manufactured from high quality 50–125 ream weight, pigment filled, alpha cellulose paper impregnated with a water alcohol solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the manufacture of the decorative laminate.

Decorative laminates are generally manufactured by stacking the resin impregnated core sheets, the decorative sheet and the overlay layer to form a laminate sheet assembly, or laminate lay-up. The laminate lay-up is placed between steel plates and subjected to temperatures in the range of about 56.24 $kg/cm^2$–112.48 $kg/cm^2$ for a time sufficient to consolidate the laminate and cure the resins (generally about 25 minutes to an hour). The pressure and heat force the resin in the paper sheets to flow, cure and consolidate the sheets into a unitary laminated mass referred to in the art as a high pressure decorative laminate. Finally, the formed decorative laminate is bonded to a reinforcing substrate, such as, plywood, hardboard, asbestos board, particle board or the like.

The above discussion generally relates to high pressure laminates. Where a less expensive, less durable laminate is required, low pressure laminates may be used by fabricators. Low pressure laminates are generally composed of only the decorative and overlay layers. As with high pressure laminates, low pressure laminates may be secured to a substrate for added structural rigidity. The removal of the core results in a laminate which is cheaper to manufacture, but does not offer the strength and durability of high pressure laminates.

As mentioned above, the decorative sheet dictates the aesthetic appearance of the resulting decorative laminate. Prior decorative sheets range from vibrant colors to pure white, imitation wood to imitation granite, and many variations therebetween. The wide range of available designs provides consumers with a versatile, inexpensive product for fabricating countertops, flooring panels, wall panels, etc.

With this in mind, decorative laminate manufacturers and fabricators are continually attempting to develop laminates providing consumers with a new, aesthetically pleasing, visual experience. In addition, manufacturers are continually striving to improve prior laminates by adding new functional components which may be applied to take advantage of the durability and cost offered by decorative laminates.

The present invention provides a decorative laminate offering consumers a novel visual experience by adding an electroluminescent compound to the laminate. The addition of the electroluminescent compound to laminates in accordance with the present invention adds new functional features to laminates improving upon their prior use in the area of displays and signs. In fact, the provision of luminescent laminate provides consumers with an active surface product in contrast to those static surface products which are already well known in the prior art.

SUMMARY OF THE INVENTION

It is, therefore, an object of the present invention to provide a laminate including at least a first resin impregnated sheet having an electroluminescent compound dispersed therein and electrical leads coupling the electroluminescent compound to a source of electrical energy.

It is also an object of the present invention to provide a method for manufacturing an electroluminescent laminate. The method is realized by applying an electroluminescent compound to a first resin impregnated sheet, applying electrical leads to the first sheet for the selectively application of electrical energy and heating and pressing the first sheet.

It is also an object of the present invention to provide an electroluminescent laminate formed in accordance with a method described above.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a cross sectional view of the laminate shown in FIG. 2.

FIG. 4 is a cross sectional view of an alternate embodiment of a laminate in accordance with the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
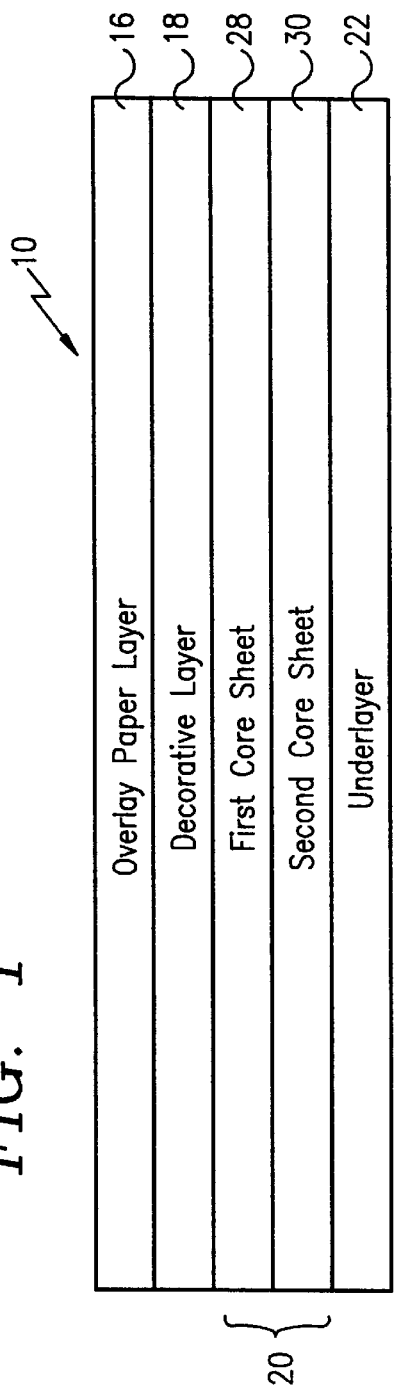
FIG. 1 is a schematic of a laminate in accordance with the present invention.
Figure 2:
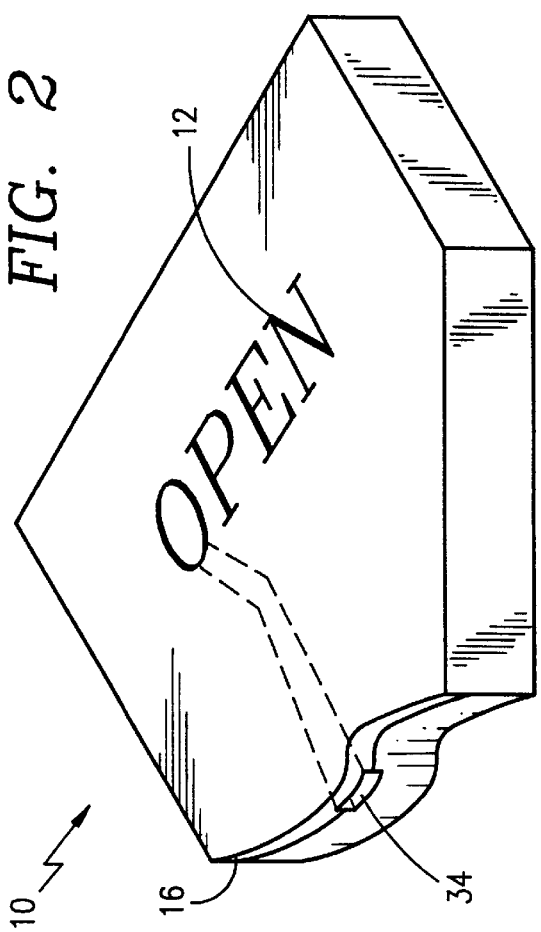
FIG. 2 is perspective view of a laminate in accordance with the present invention.

With reference to FIG. 1, an electroluminescent laminate 10 in accordance with the present invention is disclosed. The electroluminescent laminate 10 of the present invention provides an electrically excitable luminescent pattern 12 which may be selectively exhibited by simply providing a flow of electrical energy to the electroluminescent compound 14 applied to the laminate in the manner discussed below. In this way, the pattern exhibited by the electroluminescent laminate may be varied to suit specific moods. In fact, it is contemplated that multiple patterns may be applied to single laminate sheet such that a selected pattern is revealed as the operator sees fit.

In accordance with a preferred embodiment of the present invention, the electroluminescent laminate 10 includes an overlay paper layer 16, a decorative layer 18, a phenolic core 20 and a melamine underlayer 22. While a specific layering pattern is disclosed in accordance with a preferred embodiment of the present invention, the layering pattern may be varied, somewhat, without departing from the spirit of the present invention.

The overlay paper layer 16 is preferably a melamine impregnated paper layer. The overlay paper layer 16 is preferably manufactured from a low basis weight transparent sheet impregnated with resin, for example, melamine. The resin impregnated overlay paper layer 16 is subsequently dried, partially cured and finally cut into sheets. While the paper may exhibit opaque properties prior to heating and pressing, the overlay paper layer. 16 in the final fabricated laminate is preferably transparent to permit viewing of the decorative sheet 18 positioned directly beneath the overlay paper layer 16.

In accordance with a preferred embodiment of the present invention, an electroluminescent compound 14 is applied directly to the top side 24 of the overlay paper layer 16. In this way, the electroluminescent compound 14 is clearly viewed when excited by the application of electrical current.

The electroluminescent compound 14' may, however, be applied to the underside 26' of the overlay paper layer 16' without departing from the spirit of the present invention (see FIG. 4). It is contemplated that the electroluminescent compound 14' would be applied to the underside 26' of the overlay paper layer 16' where a more diffused luminescent effect is desired. The diffused luminescent effect would be created by the passage of the generated light through the overlay paper layer 16' before reaching the eyes of an individual viewing the laminate 10'.

The following electroluminescent compounds have been successfully applied to the overlayer paper layer resulting in a electroluminescent, high pressure laminate.

| Compound #1 | |
|---|---|
| 10.1045 g | Vinyl Ester Resin |
| 0.3297 g | Dicumyl Peroxide |
| 1.5016 g | Methyl Ethyl Ketone |
| 1.20 g | Silver Powder |
| 9.0 g | LumiNova ® BG-300M Pigment |
| Compound #2 | |
| 7.6882 g | Vinyl Ester Resin |
| 0.3871 g | Dicumyl Peroxide |
| 1.2530 g | Methyl Ethyl Ketone |
| 1.2530 g | Copper Powder |
| 9.0 g | LumiNova ® BG-300M Pigment |

LumiNova® is phosphorescent pigment manufactured by United Material and Chemical Corp., Lyndhurst, N.J. While specific electroluminescent compounds are disclosed in accordance with a preferred embodiment of the present invention, other electroluminescent compounds may be used without departing from the spirit of the present invention.

As mention above, the electroluminescent compound 14, 14' is applied to the overlay paper layer 16, 16'. The electroluminescent compound 14, 14' is applied to the overlay paper layer 16, 16' prior to the formation of the laminate lay-up. In accordance with a preferred embodiment of the present invention, the electroluminescent compound 14, 14' is brushed on the overlay paper layer 16, 16' using a conventional artist's brush. The electroluminescent compound 14, 14' is brushed on to the overlay paper layer 16, 16' in a predetermined pattern, creating a desired luminescent appearance when electrical energy is applied in a manner which will be discussed below in greater detail.

While a preferred embodiment of the present invention employs a brush for the application of the electroluminescent compound to the overlay paper layer, it is appreciated that brush application may not be appropriate for large scale production and those skilled in the art will appreciate the variety of application techniques which may be used without departing from the spirit of the present invention.

The decorative layer 18, 18' is a conventional pattern sheet positioned directly beneath the overlay paper layer 16, 16'. When the laminate 10, 10' is fully heated and pressed, as will be discussed below in greater detail, the overlay paper layer 16, 16' becomes translucent, fully exposing the decorative layer 14, 14'. With this in mind, and when the electroluminescent compound 14, 14' is not excited by the application of electrical energy, the decorative layer 18, 18' is substantially responsible for the aesthetic appearance of the finished decorative laminate 10, 10'. However, when electrical energy is applied to the electroluminescent compound 14, 14', the compound luminesces to reveal a decorative pattern coordinated with that of the decorative layer 18, 18'.

While the electroluminescent compound 14, 14' is not readily visible until excited in accordance with the embodiment discussed above, it is contemplated that the electroluminescent compound 14, 14' may be altered such that it is visible under both excited and nonexcited conditions. Electroluminescent compounds such as this may be used in applications where a design, created with the electroluminescent compound, is viewed under lighted conditions with the design in its unexcited state and viewed in the dark with the design in its excited state. The use of such an electroluminescent compound in this way would certainly find use in laminate road signs which must be clearly viewed in both light and dark conditions. Laminate signs manufactured in this manner would enable the viewing of designated information without the necessity of relying upon the reflection of headlights to allow for the viewing of the posted information.

The decorative layer 18, 18' is chosen from a wide array of sheets. For example, the decorative layer 18, 18' may be a solid color (for example, white) or include an aesthetically appealing pattern. As discussed above, the decorative layer 18, 18' provides the laminate with an attractive appearance when the electroluminescent compound 14, 14' is not excited and enhances the laminate appearance when the electroluminescent material 14, 14' is excited.

The overlay paper layer 16, 16' and the decorative layer 18, 18' also dictate the surface characteristics of the final decorative laminate 10. For example, the composition of the overlay paper layer 16, 16' and decorative layer 18, 18' dictate the decorative laminate's resistance to chemical agents, heat, light, shock and abrasion.

As discussed above, decorative sheets are commonly manufactured from high quality 50–125 ream weight, pigment filled, alpha cellulose paper impregnated with a water alcohol or water solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photogravure reproduction of natural materials, such as, wood, marble, leather, etc. The aesthetic characteristics of the cellulose paper are revealed as the laminate's decorative design upon completion of the decorative laminate.

The core layer 20, 20' is preferably a composed of first and second phenolic resin impregnated sheets 28, 28', 30, 30' although other materials, and volume of sheets, may be used without departing from the spirit of the present invention. For example, the core layer 20, 20' include two sheets of 41–68 kilogram phenolic resin impregnated kraft paper. The kraft paper is impregnated throughout and bonded with a substantially completely cured phenolic resin which has been converted to a thermoset state during the initial laminating step.

With reference to FIGS. 3 and 4, electrical leads 32, 32' are formed in the core layer 20, 20' for the attachment of copper wires from a power source. The leads 32, 32' are preferably copper leads although other lead types may be used without departing from the spirit of the present invention. The leads 32, 32' are linked to the electroluminescent compound 14, 14' of the overlayer paper layer 16, 16' to selectively provide electrical energy to the electroluminescent compound 14, 14' of the overlayer paper layer 16, 16'. The links 34, 34' connecting the copper leads 32, 32' to the electroluminescent compound 14, 14' are preferably formed from electrically conductive ink applied to the core layer 20, 20' and the overlayer paper layer 16, 16' in a manner creating a continuous span between the layers of the laminate 10, 10'.

Both the links 34, 34' and the copper leads 32, 32' are preferably painted on the respective surfaces to direct electrical current from an external source (not shown) to the electroluminescent compound 14 applied to the overlay paper layer 16. The copper leads 32, 32' are preferable formed either through the underside 38 of the core layer 20 (see FIG. 3) or along the edge 36' of the core layer 20' (see FIG. 4). By forming the electrical leads either along the edge 36' or underside 38 of the core layer 20, 20' the electrical source may be substantially hidden from the those viewing the front of the electroluminescent laminate fabricated in accordance with the present invention. Those skilled in the art will also appreciate that the electrical source may be linked to the electroluminescent compound in a variety of ways without departing from the spirit of the present invention.

The underlayer 22, 22' is a melamine impregnated sheet similar to that used as the decorative sheet 18, 18'. As such, the underlayer is commonly manufactured from high quality 50–125 ream weight, pigment filled, alpha cellulose paper impregnated with a water alcohol or water solution of melamine-formaldehyde resin. The resin impregnated underlayer sheets are subsequently dried, partially cured, and finally cut into sheets.

Once the appropriate layers of the laminate are formed, the sheets are stacked in a conventional manner, and the laminate lay-up is heated and pressed. Specifically, and in accordance with a preferred embodiment of the present invention, the layers are first stacked and placed between steel plates. The laminate stack is then subjected to temperatures in the range of 121° C.–160° C., preferably 131° C., and about 18.28 kg/cm$^2$ for approximately 20 minutes. The laminate is then to cool for approximately 10 minutes before it is ready for further processing in preparation for its use in the manufacture of various products.

While specific temperatures, pressures and times are disclosed in accordance with a preferred embodiment of the present invention, those skilled in the art will appreciate the variety of pressing techniques which may be used without departing from the spirit of the present invention.

The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

The embodiment discussed above relates to the manufacture of high pressure laminates. However, it is contemplated that the present teachings are readily applicable to the manufacture of low pressure laminates and the manufacture of low pressure laminates with an electroluminescent design is considered to fall within the spirit of the present invention.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A decoratve laminate formed under heat and pressure to form a unitary structure, comprising:

at least a first resin impregnated paper sheet having an electroluminescent compound dispersed therein and electrical leads coupling the electroluninescent compound and first resin impregnated paper sheet to a source of electrical energy;

a second resin impregnated paper sheet over which the first resin impregnated paper sheet lies;

the first resin impregnated paper sheet and the second resin impregnated paper sheet being formed under heat and pressure to form a unitary laminated mass; and further including a core layer, composed of at least one resin impregnated paper sheet, over which the first resin impregnated paper sheet and the second resin impregnated paper sheet lie, wherein the core layer includes conductive leads for attachment to a power source.

2. The laminate according to claim 1, wherein the second resin impregnated paper sheet is a decorative layer.

3. The laminate according to claim 2, wherein the decorative layer includes a printed design coordinated with the electroluminescent compound of the first resin impregnated paper sheet to create an aesthetically desirable appearance.

4. The laminate according to claim 1, wherein the first resin impregnated paper sheet is a decorative layer.

5. The laminate according to claim 1, wherein the electroluminescent compound includes silver.

6. The laminate according to claim 1, wherein the electroluminescent compound includes copper.

7. The laminate according to claim 1, wherein the core layer is electrically coupled to the first resin impregnated paper sheet.

8. An electroluminescent decorative laminate formed in accordance with a method comprising the following steps:

applying an electroluminescent compound to a fist resin impregnated paper sheet;

applying electrical leads to the first resin impregnated paper sheet for the selective application of electrical energy to the elecrolmescent compound and the first resin impregnated paper sheet:

staking a second resin impregnated paper sheet with the first resin impregnated paper sheet;

staking a core layer, composed of at least one resin impregnated paper sheet, beneath the first resin impregnated paper sheet and the second resin impregnated paper sheet, and the core layer includes conductive leads for attachment to a power source; and heating and pressing the first resin impregnated paper sheet, the second resin impregnated paper sheet and the core layer to form a unitary laminated mass.

9. The electroluminescent laminate according to claim 8, wherein the second resin impregnated paper sheet comprises a decorative layer.

10. The electroluminescent laminate according to claim 9, wherein the decorative layer includes a printed design coordinated with the electroluminescent compound of the first resin impregnated paper sheet to create an aesthetically desirable appearance.

11. The electroluminescent laminate according to claim 8, wherein the first resin impregnated paper sheet is a decorative layer.

12. The electroluminescent late according to claim 8, wherein the electroluminescent compound includes silver.

13. The electroluminescent laminate according to claim 8, wherein the electroluminescent compound includes copper.

14. The electroluminescent laminate according to claim 8, wherein the core layer is electrically coupled to the first resin impregnated paper sheet.

\* \* \* \* \*